(12) United States Patent
Furuta et al.

(10) Patent No.: US 9,162,325 B2
(45) Date of Patent: Oct. 20, 2015

(54) WELDING APPARATUS

(71) Applicant: Keylex Corporation, Hiroshima (JP)

(72) Inventors: Takeshi Furuta, Hiroshima (JP);
Shunsuke Okamoto, Hiroshima (JP)

(73) Assignee: KEYLEX CORPORATION, Hiroshima (JP)

( * ) Notice: Subject to any disclaimer, the term of this patent is extended or adjusted under 35 U.S.C. 154(b) by 0 days.

(21) Appl. No.: 14/565,772

(22) Filed: Dec. 10, 2014

(65) Prior Publication Data
US 2015/0090769 A1   Apr. 2, 2015

Related U.S. Application Data

(63) Continuation of application No. PCT/JP2012/006100, filed on Sep. 25, 2012.

(51) Int. Cl.
*B23K 37/04* (2006.01)
*B23K 37/047* (2006.01)
*B23K 11/11* (2006.01)

(52) U.S. Cl.
CPC ............ *B23K 37/047* (2013.01); *B23K 11/115* (2013.01); *B23K 37/0443* (2013.01); *B23K 37/0452* (2013.01); *B23K 37/0461* (2013.01)

(58) Field of Classification Search
None
See application file for complete search history.

(56) References Cited

U.S. PATENT DOCUMENTS

| | | | | |
|---|---|---|---|---|
| 192,813 | A * | 7/1877 | Brooks et al. | 269/13 |
| 228,865 | A * | 6/1880 | Case | 294/28 |
| 356,196 | A * | 1/1887 | Eley | 228/26 |
| 386,759 | A * | 7/1888 | Solter | 228/48 |
| 389,438 | A * | 9/1888 | Brooks | 228/14 |
| 4,008,843 | A * | 2/1977 | Nagano et al. | 228/33 |
| 4,165,245 | A * | 8/1979 | Ludwig | 148/521 |
| 4,369,958 | A * | 1/1983 | Maynard | 269/61 |
| 4,541,062 | A * | 9/1985 | Kada et al. | 700/247 |
| 4,568,070 | A * | 2/1986 | Severt | 269/60 |
| 4,602,417 | A * | 7/1986 | Mesch et al. | 29/564 |
| 4,660,753 | A * | 4/1987 | Kushibe et al. | 228/48 |

(Continued)

FOREIGN PATENT DOCUMENTS

| | | | |
|---|---|---|---|
| CA | 2611824 A1 * | 12/2006 | |
| DE | 3934961 A1 * | 4/1991 | B23P 19/04 |

(Continued)

OTHER PUBLICATIONS

International Search Report from International Application No. PCT/JP2012/006100 dated Jan. 8, 2013.

*Primary Examiner* — Kiley Stoner
(74) *Attorney, Agent, or Firm* — Alston & Bird LLP

(57) ABSTRACT

Provided is a welding apparatus by which a worker can work in a comfortable posture, with which a space can be effectively utilized at a low cost, and which can reliably weld workpieces. Specifically, a pair of jigs are circumferentially provided on the upper surface of a circular rotating table around its outer circumference at intervals, and positions workpieces such that orientations of the workpieces are changeable. A welding robot is provided in a workpiece welded region. A control board outputs an operation signal to the rotating table such that the jigs respectively move into a workpiece set region and the workpiece welded region, and outputs an operation signal to the respective jigs such that the jig in the workpiece set region is inclined toward a side closer to the worker and the jig in the workpiece welded region is inclined according to welded parts of the workpieces.

3 Claims, 4 Drawing Sheets

(56) References Cited

U.S. PATENT DOCUMENTS

| | | | | |
|---|---|---|---|---|
| 4,737,611 | A | * | 4/1988 | Humblot .................. 219/86.25 |
| 4,843,904 | A | * | 7/1989 | Moore ........................... 74/396 |
| 5,083,070 | A | * | 1/1992 | Poupard et al. ............ 318/568.1 |
| 5,704,601 | A | * | 1/1998 | Mangelsen et al. ............ 269/57 |
| 6,036,082 | A | * | 3/2000 | Caldarone .................... 228/212 |
| 6,622,906 | B1 | * | 9/2003 | Kushibe ....................... 228/212 |
| 6,634,484 | B2 | * | 10/2003 | Gattrell et al. ............... 198/375 |
| 8,006,891 | B2 | * | 8/2011 | Osicki ......................... 228/49.2 |
| 8,777,085 | B2 | * | 7/2014 | Mercier .......................... 228/11 |
| 2004/0118897 | A1 | * | 6/2004 | Caldarone et al. ........... 228/49.1 |
| 2006/0278622 | A1 | * | 12/2006 | Inoue et al. ................ 219/125.1 |
| 2007/0235433 | A1 | * | 10/2007 | Osicki ........................ 219/125.1 |
| 2010/0044414 | A1 | * | 2/2010 | Charbel et al. ................ 228/102 |
| 2011/0084434 | A1 | * | 4/2011 | Osicki et al. ................... 269/57 |
| 2011/0195535 | A1 | * | 8/2011 | Koyanagi et al. ............... 438/33 |
| 2011/0240612 | A1 | * | 10/2011 | Maeno .................... 219/121.63 |
| 2012/0324688 | A1 | * | 12/2012 | Nohmi ............................ 29/237 |
| 2013/0113149 | A1 | * | 5/2013 | Yeum ............................. 269/59 |
| 2014/0015186 | A1 | * | 1/2014 | Wessel et al. ................... 269/97 |
| 2014/0080690 | A1 | * | 3/2014 | Noma et al. ..................... 483/55 |
| 2015/0027996 | A1 | * | 1/2015 | Zaffino et al. ................... 219/74 |
| 2015/0034699 | A1 | * | 2/2015 | Zhang ......................... 228/47.1 |
| 2015/0034700 | A1 | * | 2/2015 | Zhang ........................... 228/49.5 |

FOREIGN PATENT DOCUMENTS

| | | | | | |
|---|---|---|---|---|---|
| FR | | 2631100 | A1 | * | 11/1989 ............. B23P 21/00 |
| GB | | 2245515 | A | * | 1/1992 ............. B23K 37/04 |
| GB | | 2317354 | A | * | 3/1998 ............. B23K 37/04 |
| JP | | H07-185827 | A | | 7/1995 |
| JP | | 2003-320296 | A | | 11/2003 |
| JP | | 2004-122175 | A | | 4/2004 |
| JP | | 2007-319866 | A | | 12/2007 |
| WO | WO 2010004145 | A1 | * | 1/2010 ............. B62D 65/02 |

\* cited by examiner

WELDING APPARATUS

CROSS-REFERENCE TO RELATED APPLICATIONS

This is a continuation of International Application No. PCT/JP2012/006100 filed on Sep. 25, 2012, which designates the U.S. The entire disclosure of the application is incorporated by reference herein.

BACKGROUND

The present disclosure relates to welding apparatuses for use in, for example, automobile production lines.

Conventionally, a body of an automobile is produced by positioning a plurality of press-molded workpieces in a jig, and welding the workpieces in various manners to assemble them together.

For example, a welding apparatus, for automobile bodies, disclosed in Japanese Unexamined Patent Publication No. H07-185827 (paragraphs [0008]-[0016] and FIG. 1) includes a rotating table rotatable around a vertically extending rotation axis, two jigs are placed on the upper surface of the rotating table around its outer circumference at 180° intervals in its circumferential direction. The jigs are placed such that, in a non-operating state of the rotating table, one of the jigs is placed in a region where workpieces are welded (hereinafter referred to as "workpiece welded region") and the other of the jigs is placed in a region where workpieces are set (hereinafter referred to as "workpiece set region"), and in the workpiece welded region, one welding robot whose arm end has a welding gun is placed.

When the workpieces positioned in the one jig are welded by the welding robot, other workpieces that will be succeedingly assembled are set and positioned in the other jig in advance, and after a welding operation in the one jig is finished, the rotating table is rotated by 180° to allow the one jig to move into the workpiece set region and the other jig to move into the workpiece welded region. Then, the workpieces in the other jig are welded by the welding robot while the assembly of the workpieces is taken out of the one jig that has moved into the workpiece set region and other workpieces that will be succeedingly assembled are set and positioned in the one jig, thereby improving productivity.

SUMMARY

However, in the welding apparatus in Japanese Unexamined Patent Publication No. H07-185827 (paragraphs [0008]-[0016] and FIG. 1), when workpieces are set in the jig, they have to be moved from the upper part of the jig to the lower part thereof, and if a worker manually sets the workpieces from the side of the rotating table, the worker has to work in an incorrect posture, applying a large load to the worker's body. Addition of an industrial multi-shaft robot, etc., for positioning the workpieces may avoid this problem. However, it causes an increase in cost and a necessity to have a space for placing the industrial multi-shaft robot, etc.

In Japanese Unexamined Patent Publication No. H07-185827 (paragraphs [0008]-[0016] and FIG. 1), if a place far from the welding robot is welded, some workpieces may not be able to be welded due to their shapes, etc., since the welding robot has a limited movable range.

The present disclosure has been developed in view of the above problems, and it is an object of the present disclosure to provide a welding apparatus by which a worker can work in a comfortable posture, with which a space can be effectively utilized at a low cost, and which can reliably weld workpieces.

In order to attain the above object, the present disclosure is characterized by inclining jigs placed in a rotating table.

Thus, a first aspect of the disclosure is directed to a welding apparatus including: a circular rotating table supported by a vertically extending rotation shaft, and rotating between a workpiece set region and a workpiece welded region; a plurality of jigs circumferentially provided on an upper surface of the rotating table around an outer circumference thereof at intervals, and configured to position workpieces such that orientations of the workpieces are changeable; a welding robot provided in the workpiece welded region; and control means connected to the rotating table and the respective jigs, and configured to output an operation signal to the rotating table such that the respective jigs move into the workpiece set region and the workpiece welded region, and output an operation signal to the respective jigs such that one of the jigs in the workpiece set region is inclined toward a worker and another one of the jigs in the workpiece welded region is inclined according to welded parts of the workpieces.

According to a second aspect of the disclosure, in the first aspect of the disclosure, each of the jigs includes a grasper grasping a corresponding one of the workpieces, and a supporting table supporting the grasper, and a center of a lower part of the supporting table in a radial direction of the rotating table is inclinably supported by a horizontal shaft extending in a direction crossing the radial direction of the rotating table.

According to a third aspect of the disclosure, in the first or the second aspect of the disclosure, the control means is configured to simultaneously output an operation signal to the rotating table, and an operation signal to the respective jigs in the workpiece set region and the workpiece welded region such that each of the jigs is able to have an orientation necessary to a succeeding step.

According to a fourth aspect of the disclosure, in the first or the second aspect of the disclosure, the control means is configured to output an operation signal to the respective jigs such that the respective jigs are inwardly inclined in a radial direction of the rotating table before rotating the rotating table.

According to the first aspect of the disclosure, when the workpieces are set into the jig, the jig in the workpiece set region is inclined toward a side closer to the worker in the rotating table, whereby a part in which the workpieces are set faces toward the side closer to the worker. Therefore, the worker can substantially horizontally or obliquely move the workpieces from the side of the rotating table toward the jig, and works in a comfortable posture when setting the workpieces, and it is unnecessary to add a multi-shaft robot for setting the workpieces, thereby providing an apparatus not occupying a larger space at a low cost. For example, when the welded part is far from the welding robot, the jig in the workpiece welded region is inclined toward a side closer to the welding robot, and the welded part far from the welding robot gets closer to the welding robot to be positioned within a range where the welding robot is movable, thereby being able to reliably weld the workpieces.

According to the second aspect of the disclosure, the respective jigs are inclined in a well-balanced manner to face toward the outside and inside of the rotating table with the shaft interposed therebetween, thereby being able to reliably reduce the incorrect orientation of the welding robot in welding.

According to the third aspect of the disclosure, the angle of the inclination of the jig can be changed during a time when the rotating table is rotating, thereby being able to reduce a line takt time.

According to the fourth aspect of the disclosure, during the rotation of the rotating table, the respective jigs do not jut out from the outer circumferential edge of the rotating table toward the outside. This prevents the respective jigs from contacting pipes of equipment, interconnect cables, etc., placed outside the rotating table. Therefore, the rotation diameter of the rotating part of the welding apparatus is reduced, and the reduced space can be effectively utilized.

DETAILED DESCRIPTION

An embodiment of the present disclosure will be described in detail hereinafter with reference to the drawings. The following explanations of a preferred embodiment are substantially mere examples.

Figure 1:
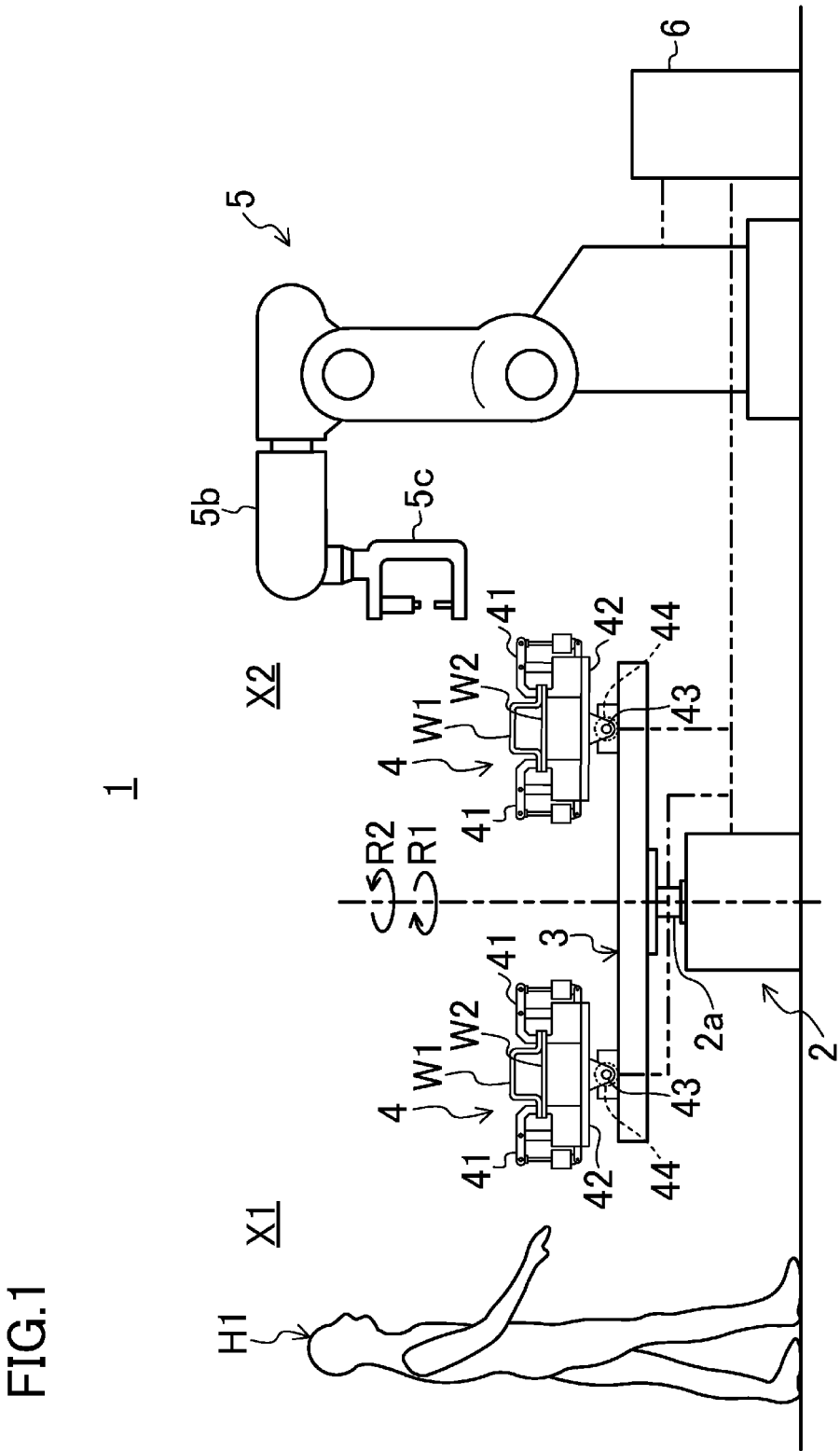
FIG. 1 is a front view of a welding apparatus according to an embodiment of the present disclosure.

FIG. 1 illustrates a welding apparatus 1 according to an embodiment of the present disclosure. The welding apparatus 1 is an apparatus, located in an automobile production line, for assembling two press-molded workpieces W1, W2 together by spot welding.

The welding apparatus 1 is placed on the ground, and includes a first motor 2 having a vertically extending rotation shaft 2a, a circular rotation table 3 supported by the rotation shaft 2a, and two jigs 4 positioning the workpieces W1, W2. With respect to a rotation axis of the rotating table 3, the left side of the paper of FIG. 1 is a workpiece set region X1 where the workpieces W1, W2 are set in the jig 4, and the right side of the paper of FIG. 1 is a workpiece welded region X2 where the workpieces W1, W2 are welded together. In the rotating table 3, a rotation (normal rotation) in a R1 direction and a rotation (reverse rotation) in a R2 direction are alternately performed between the workpiece set region X1 and the workpiece welded region X2.

The jigs 4 are provided on the upper surface of the rotating table 3 around its outer circumference at 180° intervals in the circumferential direction, and each includes a pair of graspers 41 grasping an overlapping part of the workpieces W1, W2, and a substantially plate-shaped supporting table 42 supporting the graspers 41.

The center of the lower part of the supporting table 42 in the radial direction of the rotating table is inclinably supported by a horizontal shaft 43 extending in a direction crossing the radial direction of the rotating table 3.

A second motor 44 is rotatably coupled to the horizontal shaft 43, and the rotation of the second motor 44 causes the horizontal shaft 43 to perform a normal rotation and a reverse rotation, thereby making it possible to position the workpieces W1, W2 grasped by the both graspers 41 such that the orientations of the workpieces W1, W2 are changeable.

One welding robot 5 including an industrial multi-shaft robot with an arm 5b having an end to which a welding gun 5c is attached is provided in a side of the rotating table 3 and within the workpiece welded region X2 so as to freely change the orientation of the welding gun 5c to perform welding.

A control board 6 (control means) is connected to the first motor 2 of the rotating table 3, and is configured to output an operation signal to the first motor 2 of the rotating table 3 such that the jigs 4 respectively move into the workpiece set region X1 and the workpiece welded region X2.

Figure 2:
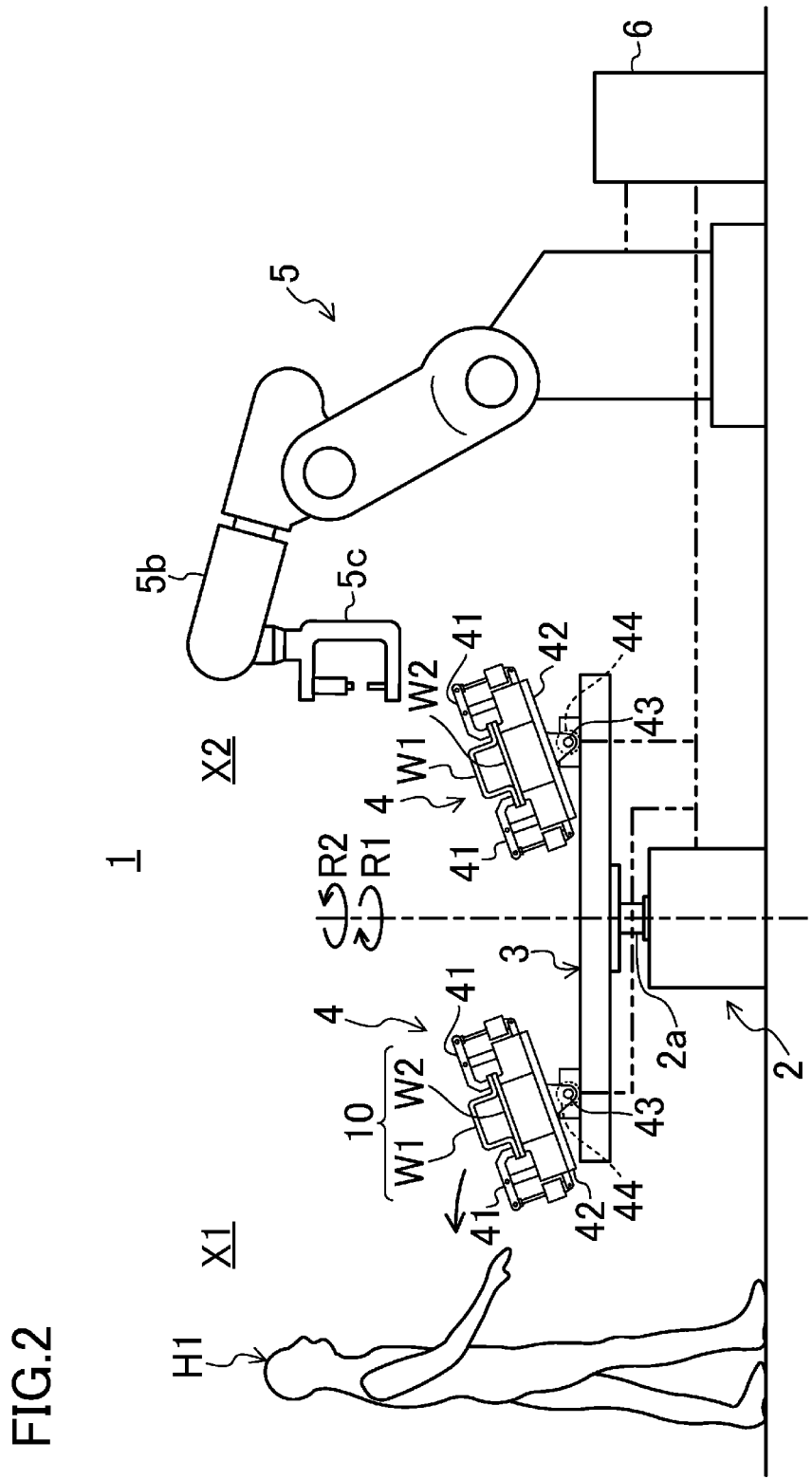
FIG. 2 is a front view illustrating a state immediately after a rotating table is rotated to allow jigs to respectively move into a workpiece set region and a workpiece welded region.
Figure 3:
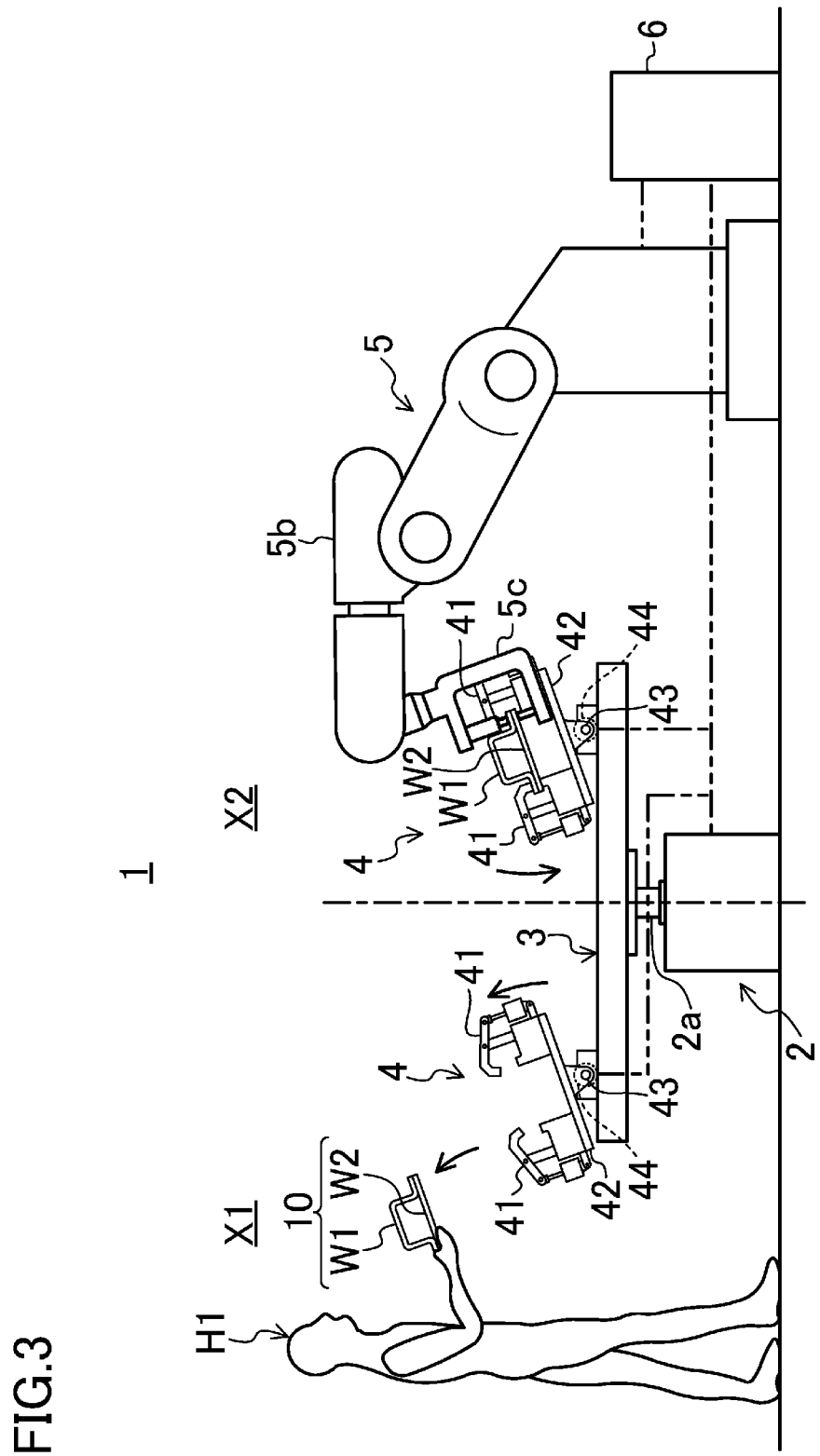
FIG. 3 is a front view of the welding apparatus illustrating a state, after the state illustrated in FIG. 2, where a worker takes an assembly of workpieces from the jig in the workpiece set region while a welding robot performs welding in the workpiece welded region.
Figure 4:
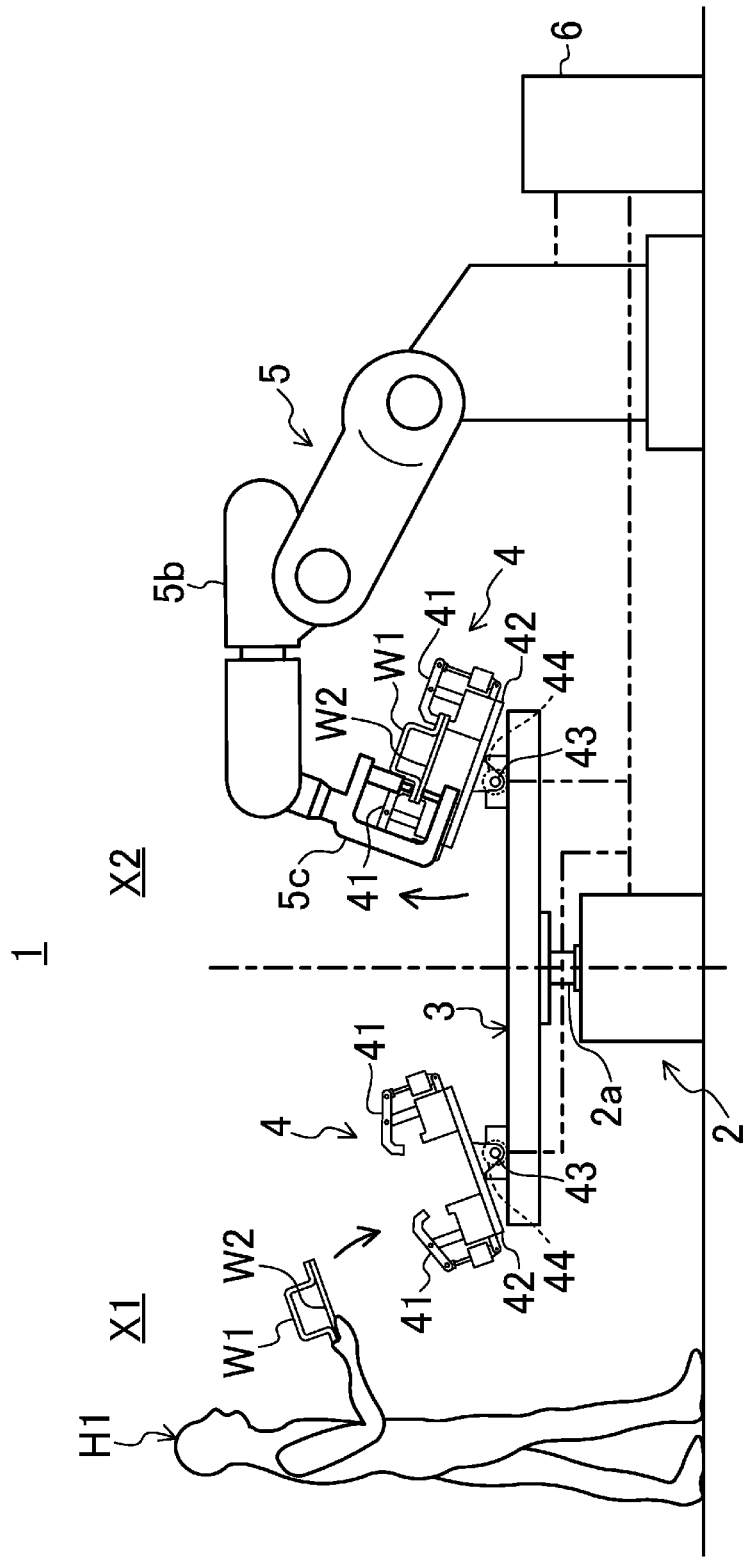
FIG. 4 is a front view of the welding apparatus illustrating a state, after the state illustrated in FIG. 3, where the worker sets unwelded workpieces in the jig in the workpiece set region while the welding robot performs welding in the workpiece welded region.

The control board 6 is also connected to the second motor 44 of each of the jigs 4, and, as illustrated in FIGS. 2-4, is configured to output an operation signal to the second motor 44 of the jig 4 in the workpiece set region X1 such that the jig 4 in the workpiece set region X1 moves closer to a worker H1, and outputs an operation signal to the second motor 44 of the jig 4 in the workpiece welded region X2 such that the jig 4 in the workpiece welded region X2 is inclined according to the welding position of the workpieces W1, W2.

Furthermore, the control board 6 is configured to output an operation signal to the first motor 2 of the rotating table 3 such that the rotating table 3 starts rotating from a non-operating state, and at the same time, output an operation signal to the second motor 44 of the jig 4 in the workpiece set region X1 such that the jig 4 of the workpiece set region X1 starts to be inwardly inclined in the radial direction of the rotating table 3.

In the embodiment, the control board 6 outputs the operation signal to the first motor 2 of the rotating table 3, and at the same time, outputs the operation signal to only the second motor 44 of the jig 4 in the workpiece set region X1. However, the embodiment is not limited thereto. It may be configured to output the operation signal to the first motor 2 of the rotating table 3, and at the same time, output the operation signal to the respective jigs 4 in the workpiece set region X1 and the workpiece welded region X2 such that each of the jigs 4 can have an orientation necessary to the succeeding step.

Subsequently, the assembly of the workpieces W1, W2 in the welding apparatus 1 will be described.

FIG. 2 illustrates a state where, immediately after the operation of the rotating table 3 rotating in the R1 direction (normal rotation), the jig 4 grasping an assembly 10 formed by assembling the workpieces W1, W2 together is positioned in the workpiece set region X1 while the jig 4 is inclined to face toward the outside of the rotating table 3, and the jig 4 in which the workpieces W1, W2 are set and positioned is positioned in the workpiece welded region X2 while the jig 4 is inclined to face toward the inside of the rotating table 3.

After the state illustrated in FIG. 2, as illustrated in FIG. 3, in the workpiece welded region X2, the welding robot 5 changes the orientation of the welding gun 5c, and then, welds overlapping, welded parts, closer to the welding robot 5, of the workpieces W1, W2 positioned by the jigs 4.

While the welding robot 5 welds the overlapping parts of the workpieces W1, W2 closer to the welding robot 5, the worker H1 takes the assembly 10 out of the jig 4 in the workpiece set region X1.

Subsequently, after the welding of the overlapping parts of the workpieces W1, W2 closer to the welding robot 5 by the welding robot 5 is finished, as illustrated in FIG. 4, the control board 6 outputs an operation signal to the second motor 44 of the jig 4 in the workpiece welded region X2 such that the jig 4 is inclined to face toward the outside of the rotating table 3.

In the workpiece welded region X2, the welding robot 5 changes the orientation of the welding gun 5c, and then, welds parts, further from the welding robot 5, of the workpieces W1, W2 positioned by the jig 4.

While the welding robot 5 welds the parts of the workpieces W1, W2 further from the welding robot 5, the worker H1 sets workpieces W1, W2, that will be succeedingly welded, into the jig 4 in the workpiece set region X1.

Then, after the welding of the welded part of the workpieces W1, W2 further from the welding robot 5 by the welding robot 5 is finished and the formation of the assembly 10 is completed, the control board 6 outputs an operation signal to the first motor 2 such that the rotating table 3 starts rotation (reverse rotation) in R2 direction, and at the same time, outputs an operation signal to the second motor 44 such that the jig 4 in the workpiece set region X1 starts to be inwardly inclined in the radial direction of the rotating table 3.

After the rotation of the rotating table 3 is stopped in the R2 direction, the state is returned to the state illustrated in FIG. 2, and then, the above steps are repeatedly performed to assemble the workpieces W1, W2.

Therefore, according to the embodiment of the present disclosure, when the workpieces W1, W2 are set into the jig 4, the jig 4 in the workpiece set region X1 is inclined toward a side closer to the worker H1 in the rotating table 3, whereby a place of the jig 4 into which the workpieces are set faces the side closer to the worker H1. Therefore, the worker H1 can substantially horizontally or obliquely move the workpieces W1, W2 from the side of the rotating table 3 toward the jig 4, and works in a comfortable posture when setting the workpieces, and it is unnecessary to add a multi-shaft robot for setting the workpieces, thereby providing an apparatus not occupying a larger space at a low cost. For example, when the welded parts is far from the welding robot 5, the jig 4 in the workpiece welded region X2 is inclined toward a side closer to the welding robot 5, the welded parts far from the welding robot 5 gets closer to the welding robot 5 to be positioned within a range where the welding robot 5 is movable, thereby being able to reliably weld the workpieces W1, W2.

The respective jigs 4 are inclined in a well-balanced manner to face toward the outside and inside of the rotating table 3 with the horizontal shaft 43 interposed therebetween, thereby being able to reliably reduce the incorrect orientation of the welding robot 5 in welding.

Furthermore, the angle of the inclination of the jig 4 can be changed during a time when the rotating table 3 is rotating, thereby being able to reduce a line takt time can be reduced.

In the embodiment, when the rotating table 3 starts rotating from a non-operating state, the jig 4 in the workpiece set region X1 simultaneously starts to be inwardly inclined in the radial direction of the rotating table 3. The embodiment is not limited thereto. For example, before the rotating table 3 is rotated, the control board 6 may output an operation signal to the respective jigs 4 such that the respective jigs 4 are inwardly inclined in the radial direction of the rotating table 3. In that case, during the rotation of the rotating table 3, the respective jigs 4 do not jut out from the outer circumferential edge of the rotating table 3 toward the outside. This prevents the respective jigs 4 from contacting pipes of equipment, interconnect cables, etc., placed outside the rotating table 3. Therefore, the rotation diameter of the rotating part of the welding apparatus 1 is reduced, and the reduced space can be effectively utilized.

In the embodiment of the present disclosure, the two jigs 4 are provided on the upper surface of the rotating table 3.

However, the embodiment is not limited thereto. Three or more jigs may be provided at intervals around the rotation shaft 2a.

A plurality of the welding robots 5 may be provided in the workpiece welded region X2.

In the embodiment of the present disclosure, one worker H1 works. However, a plurality of workers H1 may work in the workpiece set region X1.

In the embodiment of the present disclosure, the workpieces W1, W2 are assembled together by spot welding. However, they may be assembled together by arc welding, laser welding, or other welding methods.

In the embodiment of the present disclosure, the respective jigs 4 are inclined toward the radial direction of the rotating table 3. However, the embodiment is not limited thereto. For example, they may be inclined toward not only the radial direction of the rotating table 3 but also other directions by using universal joints, etc.

The present disclosure is suitable for a welding apparatus for use in, for example, automobile production lines.

What is claimed is:

1. A welding apparatus comprising:
   a circular rotating table supported by a vertically extending rotation shaft, and rotating between a workpiece set region and a workpiece welded region;
   a plurality of jigs circumferentially provided on an upper surface of the rotating table around an outer circumference thereof at intervals, and configured to position workpieces such that orientations of the workpieces are changeable;
   a welding robot provided in the workpiece welded region; and
   control means connected to the rotating table and the respective jigs, and configured to output an operation signal to the rotating table and the respective jigs,
   wherein each of the jigs includes a grasper configured to grasp workpieces, and a supporting table supporting the grasper and capable of inwardly or outwardly inclining workpieces grasped by the grasper in a radial direction of the rotating table by a horizontal shaft provided on a lower central portion of the supporting table in the radial direction of the rotating table and extending in a direction crossing the radial direction of the rotating table,
   wherein the control means is configured to output an operation signal to the rotating table such that the respective jigs move into the workpiece set region and the workpiece welded region, and
   wherein the control means is also configured to output an operation signal to the respective jigs such that one of the jigs in the workpiece set region is inclined toward a worker and another one of the jigs in the workpiece welded region is inwardly inclined in the radial direction of the rotating table when the workpieces are welded at a portion adjacent to the welding robot, whereas one of the jigs in the workpiece set region is inclined in the radial direction of the rotating table when the workpieces are welded at a portion away from the welding robot according to welded parts of the workpieces.

2. The welding apparatus of claim 1, wherein
   the control means is configured to simultaneously output an operation signal to the rotating table, and an operation signal to the respective jigs in the workpiece set region and the workpiece welded region such that each of the jigs is able to have an orientation necessary to a succeeding step.

3. The welding apparatus of claim 1, wherein the control means is configured to output an operation signal to the respective jigs such that the respective jigs are inwardly inclined in a radial direction of the rotating table before rotating the rotating table.

\* \* \* \* \*